Sept. 26, 1967    K. M. DILLABOUGH, JR    3,344,265
ELECTRICAL CONNECTOR FOR DRAWN CONVEYANCE
Filed Feb. 17, 1965    2 Sheets-Sheet 2

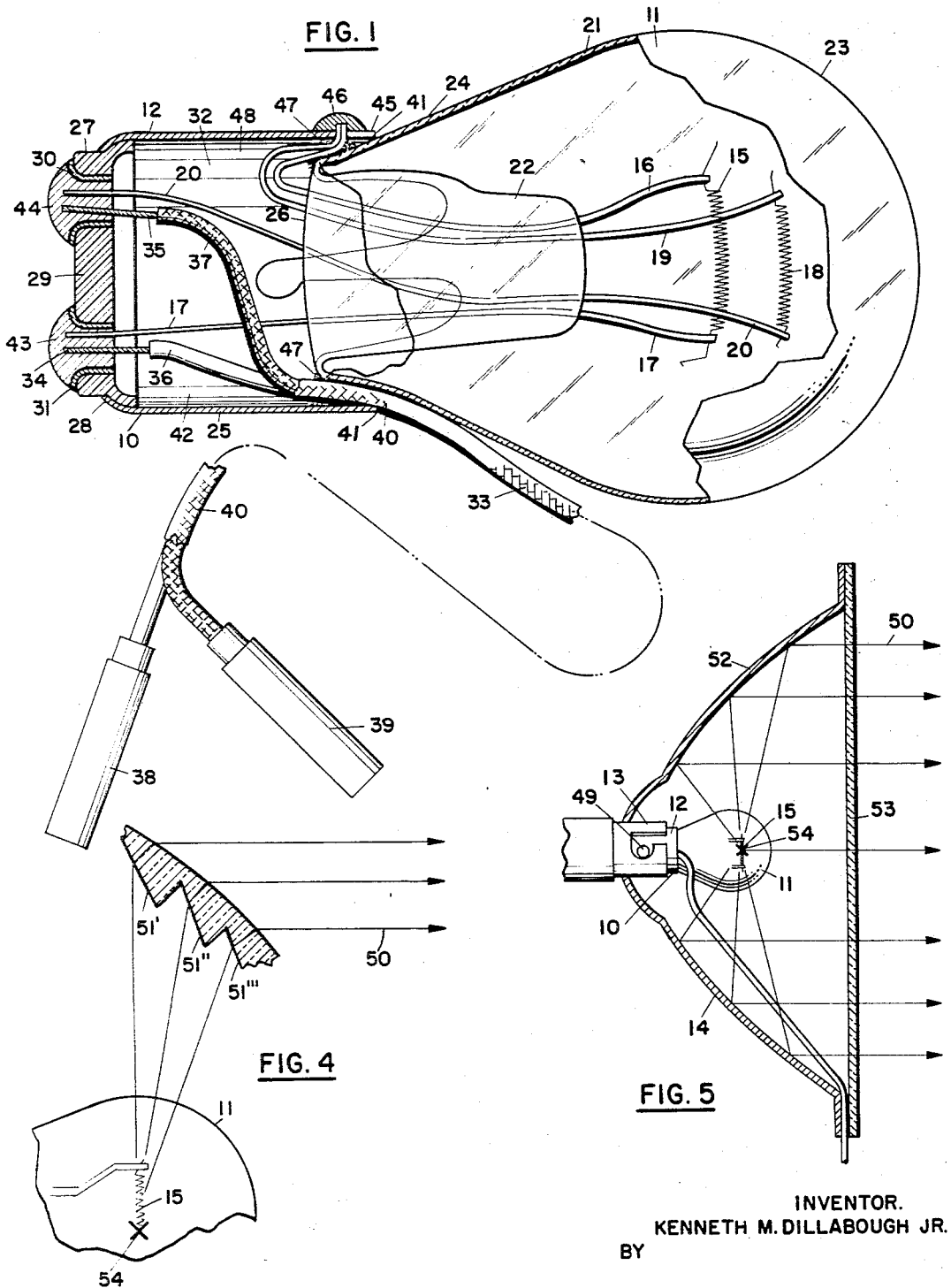

INVENTOR.
KENNETH M. DILLABOUGH JR.
BY

Morris Michael Marks
ATTORNEY.

United States Patent Office 3,344,265
Patented Sept. 26, 1967

3,344,265
ELECTRICAL CONNECTOR FOR
DRAWN CONVEYANCE
Kenneth M. Dillabough, Jr., 3436 Warden Drive,
Philadelphia, Pa. 19129
Filed Feb. 17, 1965, Ser. No. 433,379
7 Claims. (Cl. 240—8.3)

ABSTRACT OF THE DISCLOSURE

An automotive vehicle tail light bulb with tail light and brake light filaments physically located as in a standard tail light bulb so as to be disposed at the focal point of the tail light assembly optical system when the bulb is inserted in the socket of such tail light assembly, and a pair of insulated flexible electrical conductors respectively connected to the electrical energizing contacts of the bulb for the tail light and brake light filaments and each terminating in an electrical contact, the flexible electrical conductors being long enough to extend outward through the drain channel of the tail light assembly so that the terminating electrical contacts can be connected to the tail light assembly of a trailer to operate the same simultaneously with the tail light assembly of the towing vehicle.

My invention relates to electrical connectors for drawn conveyances; and it relates more particularly to means for connecting an electrical system, such for instance as the lighting assembly of a drawn conveyance, to the electrical system of a prime conveyor, which may for instance be a land vehicle such as an automobile or tractor, or a water vehicle such as a self-propelled vessel.

In the use of drawn conveyances in public areas of transportation, as a rule local laws require suitable signal lights on the drawn conveyance, operating in conjunction with the signal lights of the prime conveyor. This necessitates an appropriate electrical connection between the two. In conformance with such laws, this connection must be such as not only to cause the trailer tail light assembly light signals to go "on" and "off" at the same time as the tail lights of the prime conveyor, but also to flash the brake signal simultaneously with the flashing of the brake signal of the prime conveyor. Formerly, this entailed a cumbersome, delicate and time-consuming operation involving, in the case of an automobile, the opening of the trunk and maneuvering the wires of the tail light assembly. Other solutions involving an adapter located in the prime conveyor tail light assembly itself, have proved undesirable in that they entail the transferring of the source of light to a location elsewhere than at the focal point of the reflector or refractor lens. This inevitably would result in the blurring of the light emanating from the lens, reducing its effectiveness, and thus jeopardizing its conformance to the requirements of the law. Indeed, any attempt to connect the electrical system of a drawn conveyance to a prime conveyor by means of the tail light assembly, which would shift the location of the tail light bulb from the focal point of the reflector or lens of the tail light assembly, would itself result in such blurring. Moreover, the use of an adapter entails additional handling in order to insert or remove the adapter, and renders less certain or efficient the operation of removing a light bulb when a replacement is necessary.

Furthermore, many drawn conveyances are not intended to be permanently coupled with the same prime conveyor; but instead are intended to be readily coupled or uncoupled with various prime conveyors as the need or occasion requires. For such drawn conveyances, it is a desideratum that the electrical coupling means be such as can readily be connected or disconnected with the electrical system of the prime conveyor. Moreover, when it is anticipated that a prime conveyor is frequently to be coupled or uncoupled with a drawn conveyance, much time and labor can be saved if means can be provided on the prime conveyor for readily electrically connecting it to a drawn conveyance.

One object of my invention therefore is to provide an electrical connector whereby a drawn conveyance can be electrically connected to the tail light system of a prime conveyor through the tail light socket, without shifting the location of the tail light bulb from the focal point of the tail light assembly.

Another object of my invention is to provide an electrical connector between a prime conveyor and a drawn conveyance whereby the connecting operation is of utmost simplicity and dependability, and which can be accomplished with the expenditure of minimum time and labor.

A further object of my invention is to provide an electrical connection for a drawn conveyance, which is adapted to be permanently mounted on a prime conveyor, serving as a functioning tail light bulb of the prime conveyor while at the same time being adapted at will, to be connected to a drawn conveyance.

Another object of my invention is to provide an electrical connector between a prime conveyor and a drawn conveyance, which is easy and inexpensive to construct, dependable and efficient in operation.

With the above and other objects in view, my invention consists of the device and relationship of parts more fully described and claimed hereinafter.

For the purpose of illustrating my invention, I have shown in the accompanying drawings forms thereof which are at present preferred by me, since the same have been found to give satisfactory and reliable results, although it is to be understood that the various instrumentalities of which my invention consists can be variously arranged and organized, and that my invention is not limited to the precise arrangements and organizations of the instrumentalities as herein shown and described.

Referring now to the drawings in which like reference characters indicate like parts:

FIGURE 1 represents a vertical sectional view illustrating a construction of an electrical connector for a drawn conveyance, formed in accordance with my invention.

FIGURE 4 represents an enlarged fragmentary view illustrating the relation between the light source, lens prisms, and focal point of said lens prisms, as embodied in my invention.

FIGURE 5 represents a vertical sectional view of a parabolic reflector type of tail light assembly of a prime conveyor in combination with an electrical connector for a drawn conveyance, and embodying my invention.

Figure 6:
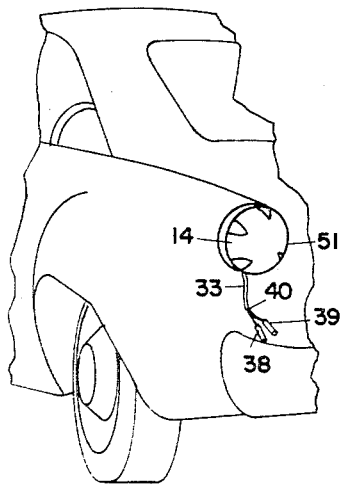
FIGURE 6 represents a perspective view of an automobile comprising a tail light in combination with an electrical connector having leads extending therefrom for connection with a drawn conveyance, in accordance with my invention.

According to my invention, I substitute for the light bulb normally used in a tail light assembly of a prime conveyor, an electrical connector 10 having its own light member 11 mounted on a suitable base 12 which is adapted to fit into and be electrically connected to a standard socket 13 of a conventional tail light assembly 14.

The light member 11 may if desired be of a conventional kind wherein, for instance, a filament 15 is mounted on a ground lead wire 16 and a hot lead wire 17, and a second filament 18 is mounted on a ground lead wire 19 and a hot lead wire 20, the filaments 15 and 18 being disposed in the interior of a transparent bulb 21, and their respective lead wires embedded in a pedestal 22 of the bulb 21, and emerging behind said pedestal 22. The bulb 21 may comprise a substantially spherical outer portion 23 drawn rearwardly into a tapering, substantially frusto-conical mounting region 24.

The base 12 may similarly be of a conventional kind normally associated with the light member 11, and may for instance consist of a tube 25 made of brass or similar conducting material and having a diameter greater than the diameter of a portion of the mounting region 24 which is substantially spaced from the rearward end 26 thereof. A shoe 27 formed of suitable insulating material extends across the rearward end 28 of the tube 25, and projects rearwardly therefrom a suitable distance to a rearward face 29. Preferably hollow contact members 30 and 31 project through the shoe 27 and lead into the interior 32 of the tube 25.

A jumper 33 is provided, and preferably comprises a plurality of flexible electrical connectors such as twisted or braided wires 34 and 35 insulated by a suitable heat-resisting electrical non-conductor 36, 37. In a preferred form the insulation 36 covering the wire 34 will be of markedly difference appearance than that of the insulation 37 covering the wire 35. Thus for instance, the insulation 36 may be black and the insulation 37 may be white. Suitable electrical receptacles 38 and 39 are respectively connected to the wires 34 and 35, and are adapted to be connected to suitable connectors (not shown) disposed in the electrical system on the drawn conveyance (not shown). A suitable heat resisting covering such as the braided covering 40 is preferably formed about the insulated wires 34 and 35 and may be joined in any suitable manner to at least one of the receptacles 38, 39. The covering 40 and insulation 36, 37 are preferably formed of material which will withstand temperatures in excess of that which is attained by the bulb 21 when the filaments 15 and 18 are energized.

The end region of the jumper 33 opposed to the receptacles 38, 39 preferably extends over the rim 41 of the tube 25 into the interior 42 thereof. Within said interior, the jumper wire 34 preferably extends through the hollow contact member 31, and the hot lead wire 17 preferably extends through the same contact member 31. A rearwardly projecting contact point 43 is preferably formed about the wires 17 and 34 and in electrical communication therewith by means of solder securing the contact member 31 and wires 17 and 34 to each other. In a similar manner, the jumper wire 35 and hot lead wire 20 extend through the contact member 30 and are electrically connected to each other by means of solder to form a rearwardly projecting contact point 44.

The ground lead wires 16 and 19 may extend through a notch 45 formed in the rim 41 and may be electrically connected to the tube 25 by suitable means such as the solder 46.

Figure 2:
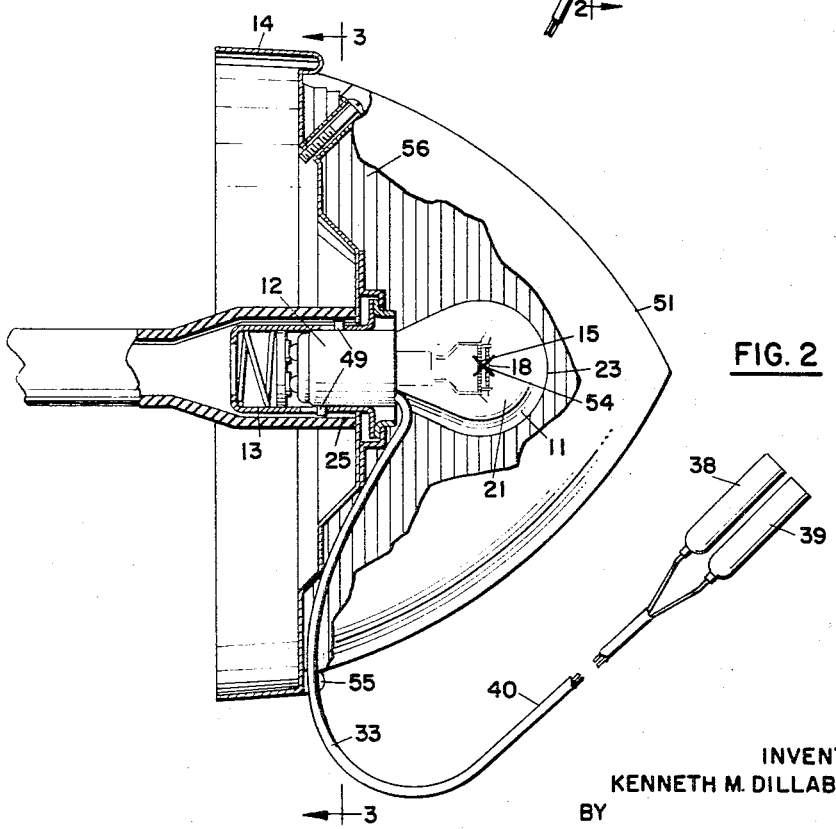
FIGURE 2 represents an elevational view, partly broken away, illustrating a refracting lens type tail light assembly of a prime conveyor in combination with an electrical connector for a drawn conveyance, and embodying my invention.

The bulb 21 may be secured to the tube 25 by any suitable means, such for instance as cement 47 disposed between the conical region 24 and the interior wall 48 of the tube 25. The conical region 24 thus substantially bears against the rim 41 throughout a substantial portion thereof, and against the heat resisting braided covering 40 of the jumper 33. The filaments 15 and 18 and bulb 21 are thus disposed at substantially the same locations they would occupy with respect to the contact points 43, 44, as they would occupy in the conventional light bulb for which this connector is substituted. Suitable lugs 49 preferably project outwardly from the tubular member 25 for engagement with the socket 13 in the tail light assembly. This assembly, in addition to the socket 13, generally consists of means for directing the light in a rearward beam 50 and coloring said light a prescribed color such as red. Such means may for instance consist of a lens 51 formed of suitable prisms such as the prisms 51', 51", 51''' as illustrated in FIGURES 2 and 4, or it may consist of a parabolic reflector 52 combined with a simple lens 53 as illustrated in FIGURE 5; or it may consist of a combination (not shown) of a reflector and a refracting lens. In any such event, a focal point 54 is established; and it is essential that the light source region be located substantially at said focal point if the beam 50 is to be rendered true. Any displacement of the source of light would thus necessarily adversely affect the quality of the beam 50. Such displacement however is eliminated by the combination light member 11, base 12 and jumper 33 as described herein.

In a conventional tail light assembly, a drain channel 55 is generally provided, thus providing an opening leading downwardly from the interior 56 of the tail light assembly. This channel 55 is usually of ample dimensions to allow the jumper 33 to pass therethrough, thereby to dispose the receptacles 38, 39 exterior of the tail light assembly 14 and in position to be electrically connected to the drawn conveyance (not shown).

Figure 3:
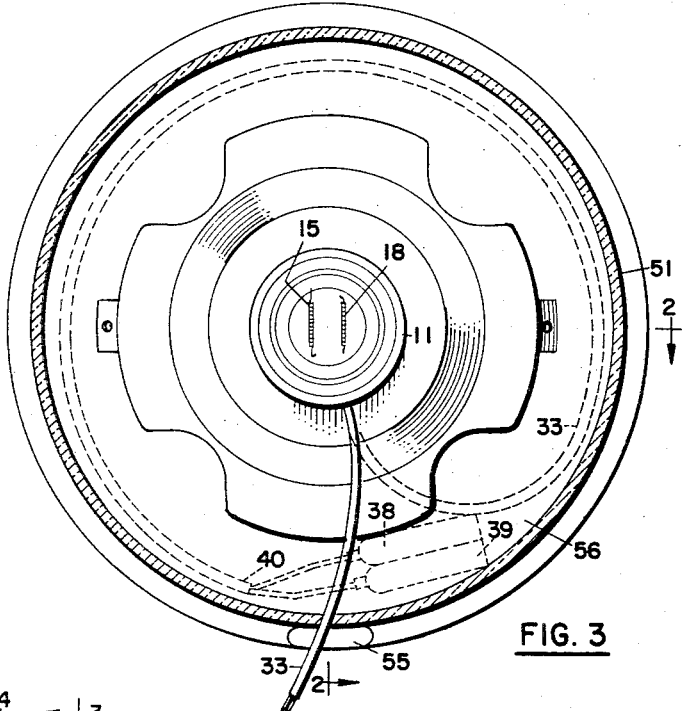
FIGURE 3 represents a rear elevational view of the tail light assembly illustrated in FIGURE 2, with the lens shown in section.

When not in use, the jumper 33 may spirally be wound between the light member 11 and the lens 51 as illustrated in FIGURE 3. In this manner, the electrical connector is carried completely within the tail light assembly 14 with the jumper entirely out of view, while the light member is a fully functioning part of the tail assembly; and the jumper is nonetheless ready for immediate use by the simple action of withdrawing the lens 51, passing the jumper 33 through the channel 55, and replacing the lens 51.

There is thus provided a ready, dependable and inexpensive means for electrically connecting a drawn conveyance to a prime conveyor with a minimum of time and labor and without any way adversely affecting the tail light beam on the prime conveyor.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent is:

1. In combination,
   a tail light assembly of a prime conveyor, and
   an electrical connector adapted to be connected to a drawn conveyance;
   said tail light assembly comprising,
      a socket having electrical contact members and an optical system having a focal point at a substantially fixed location with respect to said socket,
         said optical system being adapted to direct a beam of light when said light is located substantially at said focal point;
   said electrical connector comprising
      a light member,
      a base, and
      a jumper;
   said light member comprising
      a light source region and lead wires connected therewith and extending therefrom;
said base comprising
an interior,
a rim region, and
a plurality of contact points;
said jumper comprising
a plurality of insulated flexible conductors;
said light member being mounted on said base in substantial juxtaposition to said rim region;
said jumper extending into the interior of said base and intermediate said light member and said rim region;
one of said conductors disposed in said interior, together with one of said lead wires, being connected to one of said contact points; and
another of said conductors disposed in said interior, together with another of said lead wires, being connected to another of said contact points;
said base being disposed in said socket with said contact points in electrical communication with the contact members of said socket; and
said light source region being disposed substantially at the focal point of said optical system.

2. The combination as defined in claim 1 and further characterized by:
said insulated conductors being adapted to be carried within said tail light assembly when not in use, and to project outwardly from said tail light assembly when in position to be connected to a drawn conveyance.

3. The combination as defined in claim 1 and further characterized by:
said conductors leading to receptacles exterior of said base;
the insulation on one of said conductors being of a different appearance from the insulation on the other of said conductors, operably to identify each receptacle with the electrical circuit to which it appertains.

4. The combination as defined in claim 1 and further characterized by:
said conductors leading to receptacles exterior of said base;
the insulation on one of said conductors being of a different appearance from the insulation on the other of said conductors, operably to identify each receptacle with the electrical circuit to which it appertains;
said insulated conductors being adapted to be carried within said tail light assembly when not in use, and to project outwardly from said tail light assembly when in position to be connected to a drawn conveyance.

5. The combination as defined in claim 1 and further characterized by:
said tail light assembly comprising a drain channel disposed between the interior and exterior thereof;
said conductors leading to receptacles exterior of said base;
said conductors being adapted to extend through said drain channel and disposed said receptacles exterior of said tail light assembly.

6. The combination as defined in claim 1 and further characterized by:
said tail light assembly comprising a drain channel disposed between the interior and exterior thereof;
said conductors leading to receptacles exterior of said base;
said conductors being adapted to extend through said drain channel and disposed said receptacles exterior of said tail light assembly;
the insulation of one of said conductors being of a different appearance from the insulation on the other of said conductors, operably to identify each receptacle with the electrical circuit to which it appertains;
said insulated conductors being adapted to be carried within said tail light assembly when not in use.

7. An electrical connector adapted to connect a tail light assembly of a prime conveyor with an electrical system of a drawn conveyance, the tail light assembly of the prime conveyor being of the type including a socket having electrical contact members and an optical system having a focal point at a substantially fixed location with respect to the socket, the optical system being adapted to direct a beam of light when a light source is located substantially at the focal point,
said electrical connector comprising in combination:
a light member,
a base, and
a jumper;
said light member comprising
a light source and
lead wires connected therewith and extending therefrom;
said base comprising
an interior,
a rim region, and
a plurality of contact points;
said jumper comprising
a plurality of insulated flexible conductors, each having a free end external to said base and light member and terminating in an electrical contact;
said light member being mounted on said base in substantial juxtaposition to said rim region;
said jumper extending into the interior of said base and intermediate said light member and said rim region;
one of said conductors disposed in said interior, together with one of said lead wires being connected to one of said contact points; and
another of said conductors disposed in said interior, together with another of said lead wires, being connected to another of said contact points,
whereby, when said base is disposed in the tail light assembly socket with said contact points in electrical communication with the contact members of the socket, the said light source is disposed substantially at the focal point of the tail light assembly optical system.

References Cited
UNITED STATES PATENTS 3,137,448  6/1964  Holzhause _____ 240—8.3

NORTON ANSHER, *Primary Examiner.*

C. C. LOGAN, W. FRYE, *Assistant Examiners.*